(12) United States Patent
Higgs et al.

US012533726B2

(10) Patent No.: US 12,533,726 B2
(45) Date of Patent: Jan. 27, 2026

(54) ATOMIC LAYER DEPOSITION (ALD) FOR MULTI-LAYER CERAMIC CAPACITORS (MLCCS)

(71) Applicant: Forge Nano, Inc., Thornton, CO (US)

(72) Inventors: Daniel Higgs, Longmont, CO (US); Chris Gump, Thornton, CO (US); Karen Buechler, Westminster, CO (US); Jennette Warner, Thornton, CO (US); Paul Nelson, Thornton, CO (US); David M. King, Thornton, CO (US); Arrelaine Dameron, Thornton, CO (US); James Trevey, Thornton, CO (US)

(73) Assignee: Forge Nano, Inc., Thornton, CO (US)

( * ) Notice: Subject to any disclaimer, the term of this patent is extended or adjusted under 35 U.S.C. 154(b) by 419 days.

(21) Appl. No.: 17/904,491

(22) PCT Filed: Feb. 18, 2021

(86) PCT No.: PCT/US2021/018635
§ 371 (c)(1),
(2) Date: Aug. 18, 2022

(87) PCT Pub. No.: WO2021/168158
PCT Pub. Date: Aug. 26, 2021

(65) Prior Publication Data
US 2023/0104924 A1 Apr. 6, 2023

Related U.S. Application Data

(63) Continuation of application No. 16/793,964, filed on Feb. 18, 2020, now abandoned.

(51) Int. Cl.
| | |
|---|---|
| *B32B 15/00* | (2006.01) |
| *B22F 1/05* | (2022.01) |
| *B22F 1/16* | (2022.01) |
| *B32B 5/16* | (2006.01) |
| *B32B 5/30* | (2006.01) |

(Continued)

(52) U.S. Cl.
CPC ............... *C22C 32/00* (2013.01); *B22F 1/05* (2022.01); *B22F 1/16* (2022.01); *B32B 5/16* (2013.01); *B32B 5/30* (2013.01); *B32B 15/00* (2013.01); *C22C 1/0416* (2013.01); *C22C 1/0458* (2013.01); *C22C 1/0483* (2013.01); *C22C 32/001* (2013.01); *C23C 14/08* (2013.01); *C23C 14/083* (2013.01); *C23C 14/223* (2013.01); *C23C 16/04* (2013.01); *C23C 16/045* (2013.01); *C23C 16/40* (2013.01); *C23C 16/401* (2013.01); *C23C 16/403* (2013.01); *C23C 16/404* (2013.01); *C23C 16/405* (2013.01); *C23C 16/45525* (2013.01); *C23C 16/45527* (2013.01); *C23C 16/45529* (2013.01); *C23C 16/45553* (2013.01); *C23C 16/45555* (2013.01); *C23C 16/466* (2013.01); *H01G 4/008* (2013.01); *H01G 4/1227* (2013.01); *H01G 4/1236* (2013.01); *H01G 4/306* (2013.01); *C23C 16/4417* (2013.01); *Y10T 428/12014* (2015.01); *Y10T 428/12028* (2015.01); *Y10T 428/12049* (2015.01); *Y10T 428/12056* (2015.01); *Y10T 428/1209* (2015.01); *Y10T 428/12104* (2015.01); *Y10T 428/12181* (2015.01); *Y10T 428/12222* (2015.01); *Y10T 428/12229* (2015.01); *Y10T 428/26* (2015.01); *Y10T 428/265* (2015.01); *Y10T 428/29* (2015.01); *Y10T 428/2973* (2015.01);

(Continued)

(58) Field of Classification Search
CPC ..... C22C 32/00; C22C 32/001; C22C 1/0416; C22C 1/0458; C22C 1/0483; B22F 1/05; B22F 1/16; C23C 16/045; C23C 16/40; C23C 16/401; C23C 16/403; C23C 16/404; C23C 16/405; C23C 16/45525; C23C 16/45553; C23C 16/45555; C23C 16/466; C23C 16/4417; C23C 16/04; C23C 16/45527; C23C 14/08; C23C 14/223; C23C 14/083; H01G 4/008; H01G 4/1227; H01G 4/1236; H01G 4/306; Y10T 428/2991; Y10T 428/2982; Y10T 428/26; Y10T 428/265; Y10T 428/298; Y10T 428/2973; Y10T 428/12229; Y10T 428/12222; B32B 5/16; B32B 5/30; B32B 15/00
See application file for complete search history.

(56) References Cited

U.S. PATENT DOCUMENTS 5,296,189 A * 3/1994 Kang ..................... H05K 1/092
156/89.18
2005/0262966 A1 12/2005 Chandler et al.
(Continued)

OTHER PUBLICATIONS

International Preliminary Report on Patentability from International Application No. PCT/US2021/018635 dated Aug. 23, 2022.
(Continued)

*Primary Examiner* — Michael E. La Villa
(74) *Attorney, Agent, or Firm* — Frank Rosenberg (57) ABSTRACT

The use of Atomic Layer Deposition (ALD) and Molecular Layer Deposition (MLD) applied to powders and intermediates of the MLCC fabrication process can provide significant advantages. Coating metal particles within a defined range of ALD cycles is shown to provide enhanced oxidation resistance. Surprisingly, a very thin ALD layer was found to substantially increase sintering temperature.

12 Claims, 4 Drawing Sheets

(51) Int. Cl.
    *C22C 1/04*         (2023.01)
    *C22C 32/00*       (2006.01)
    *C23C 14/08*       (2006.01)
    *C23C 14/22*       (2006.01)
    *C23C 16/04*       (2006.01)
    *C23C 16/40*       (2006.01)
    *C23C 16/44*       (2006.01)
    *C23C 16/455*      (2006.01)
    *C23C 16/46*       (2006.01)
    *H01G 4/008*      (2006.01)
    *H01G 4/12*        (2006.01)
    *H01G 4/30*        (2006.01)

(52) U.S. Cl.
    CPC ...... *Y10T 428/298* (2015.01); *Y10T 428/2982* (2015.01); *Y10T 428/2991* (2015.01)

(56) References Cited

U.S. PATENT DOCUMENTS

| | | | |
|---|---|---|---|
| 2014/0054514 A1 | 2/2014 | Kim et al. | |
| 2014/0240898 A1* | 8/2014 | Kim | H01G 4/012 |
| | | | 156/89.12 |
| 2016/0035490 A1 | 2/2016 | Tsuru et al. | |
| 2016/0271700 A1 | 9/2016 | Akimoto et al. | |
| 2018/0286583 A1* | 10/2018 | Onoue | H01G 4/012 |
| 2019/0062914 A1 | 2/2019 | King et al. | |

OTHER PUBLICATIONS

Written Opinion of the International Search Authority from International Application No. PCT/US2021/018635 date of mailing Sep. 24, 2021.

International Search Report from International Application No. PCT/US2021/018635 date of mailing Sep. 24, 2021.

King David M. et al., "In situ synthesis of TiO2-functionalized metal nanoparticles", Industrial & Engineering Chemistry Research, (2009) 48(1), 352-360.

Naghib-Zadeh H. et al. "Low temperature sintering of barium titanate ceramics assisted by addition of lithium fluoride-containing sintering additives", Journal of the European Ceramic Society, (2010) 30(1), 81-86.

* cited by examiner

ATOMIC LAYER DEPOSITION (ALD) FOR MULTI-LAYER CERAMIC CAPACITORS (MLCCS)

RELATED APPLICATIONS

This application claims the priority benefit of U.S. patent application Ser. No. 16/793,964 filed Feb. 18, 2020, and International Patent Application No. PCT/US2021/018635 filed Feb. 18, 2021.

INTRODUCTION

Figure 1:
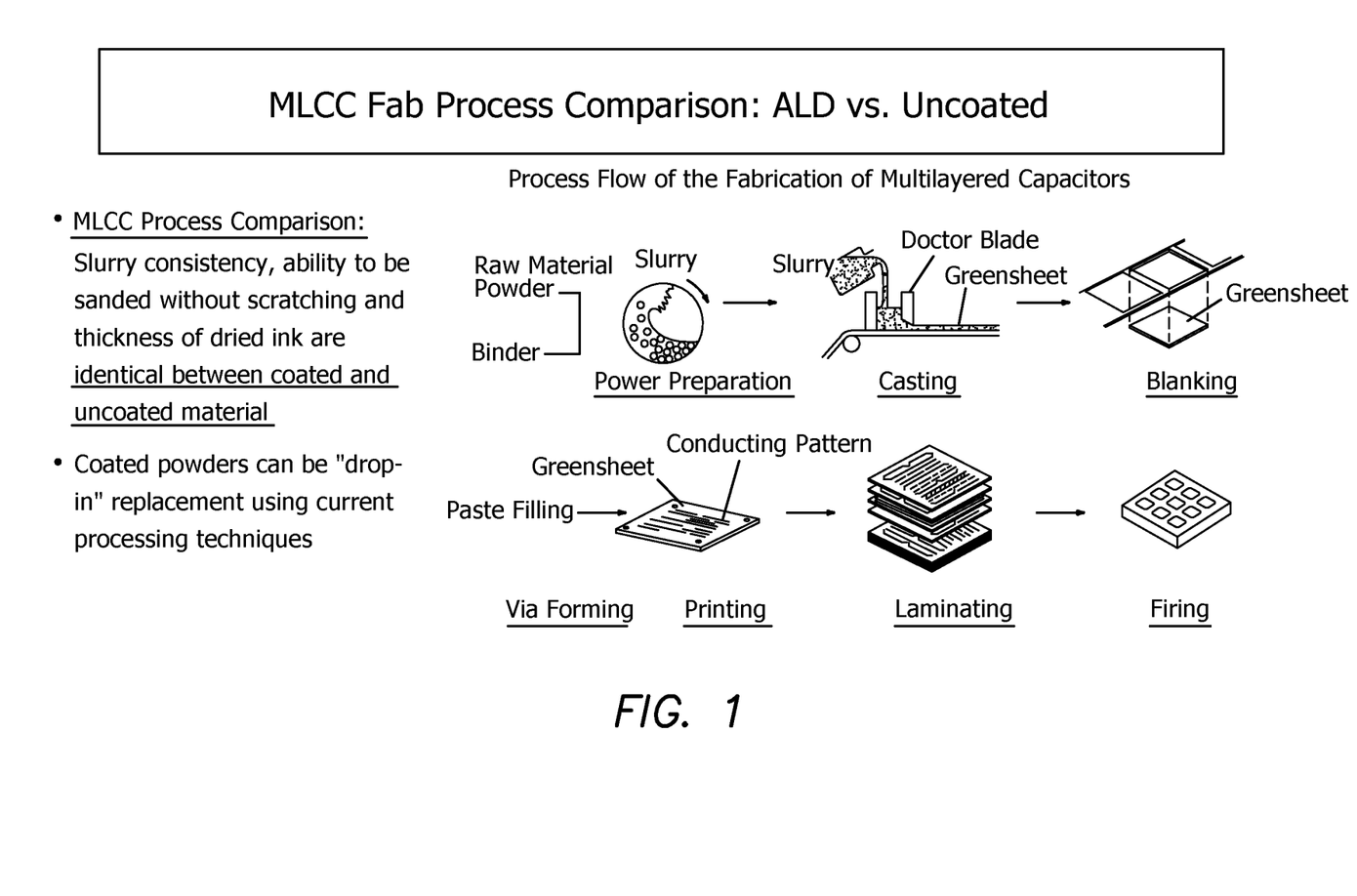
FIG. 1 illustrates a conventional method for forming MLCCs.

Multi-layer Ceramic Capacitors (MLCCs) are critical components in a large number of electronic devices and about one trillion of these devices are produced each year. Processes for converting ceramic powders into MLCCs are well established. FIG. 1 illustrates a conventional method for forming MLCCs. As described in greater detail below, the replacement of conventional powders with specialized coated powders imparts significant improvements to the methods and resulting MLCCs.

SUMMARY OF THE INVENTION

Numerous inventive aspects are disclosed herein including deposition of films onto particles to modify core metal, ceramic and other conductive or dielectric powders to create superior properties for making capacitors including MLCCs. MLCCs and intermediates useful for making MLCCs are also disclosed. The invention includes any of the method steps mentioned herein, in any combination such as would be understood by workers skilled in the area of particle coatings. The invention also includes any of articles or intermediate articles described here or resulting from the methods discussed here. In various embodiments, the coating(s) may provide one or more advantages such as novel material properties, increased flowability, improved sintering, sintering temperature control, ability to form better dispersions, enhanced stability during storage and operation, reduction in impurities, fewer defects, better electrical performance, better heat management, greater heat flux per volume or per mass during operation of a MLCC device, control of material phase segregation (i.e., metal and ceramic), and/or fewer voids.

The invention, in some preferred embodiments, enables the use of smaller particle sizes for metal and/or ceramic layers in a MLCC device. Conventional methods of making MLCCs typically use particles having diameters in the range of 200-500 nm; the invention enables highly uniform coatings of particles of less than 200 nm (e.g., 100 nm or smaller) that will enable thinner metal layers (that are conducting, conformal and continuous) in MLCCs, thus enabling more metal layers and greater capacitance per volume in or mass of a MLCC device. Creation of thinner layers of metal and/or ceramic layers in a MLCC device may also improve other performance metrics such as heat management.

The invention can also provide for better match of the sintering temperatures of metal and ceramic layers. In conventional methods, the metal powders in a metal layer typically have a lower melting temp than the ceramic powders in the ceramic layers (dielectric layers). Conventionally, a sintering retardant is mixed into the metal powders and/or coated by non-ALD methods onto the metal powders to increase the sintering temperature of the metal layers to be more close to that of the dielectric layers, however, these mixed-in sintering retardants detract from the potential performance of the MLCC device due to non-uniform mixing or other imperfections in the blended layer. The use of an ALD coating can reduce or eliminate the need for a mixed-in sintering retardant. The use of ALD coatings enables the formation of a continuous thin metal layer with few or no voids that is able to maintain metal layer to dielectric layer conductivity, enable for MLCC devices with a larger number of layers, and overall increase the MLCC device capacitance.

Coatings may be on metal or metal alloy powders for the conductive layer and/or on the ceramic or other material powders for the dielectric layer. ALD coatings may comprise, for example, metal oxides (e.g., alumina, titania), other ceramics (nitrides, sulfides, carbides, fluorides), metals, or organic material; and combinations of these. The metal particles preferably comprise Ni, Ta, Pd, Ag, Cu, Sb, and combinations thereof. Some preferred ceramic powders for the dielectric layers comprise $BaTiO_3$ or $CaZrO_3$.

ALD may also be used to etch the metal or ceramic powders or layers or device prior to deposition of ultra-thin coatings to remove native surface or contaminants.

In one aspect, the invention provides an intermediate structure for making an MLCC, comprising: a plurality of alternating dielectric green layers and electrode green layers; the dielectric green layers comprising particles of dielectric material or materials; the electrode green layers comprising particles of electrode materials coated by ALD with a sintering aid; wherein the powders of dielectric materials are not coated with the sintering aid; and wherein the sintering aid has the ability, at sufficiently high temperature, to migrate from the electrode layer into the dielectric layer where it aids in the sintering of the dielectric layers. The sintering aid has the ability, at sufficiently high temperature and one atmosphere pressure, to migrate from the electrode layer into the dielectric layer where it aids in the sintering of the dielectric layers. In some embodiments, the structure may comprise one or any combination of the following: further comprising a powdered sintering aid dispersed in the dielectric layers; wherein the powdered sintering aid comprises cations of Si, Li, B, Zn, Ti, Al, Bi and/or Y, in the form of an oxide, nitride, metal, semi-metal, metalloid, sulfide or halide, or combinations thereof; wherein the sintering aid coating comprises cations of Si, Li, B, Zn, Ti, Al, Bi and/or Y, in the form of an oxide, nitride, metal, semi-metal, metalloid, sulfide or halide, or combinations thereof; wherein the sintering aid coating comprises a first cation and a secondary cation having a valence state that is less than the first cation and having a sub-stoichiometric ratio of the second cation to the first cation. The invention includes a method of making a MLCC comprising: heating the intermediate structure to a temperature sufficient for the sintering aid to migrate into the dielectric layers; and sintering the structure to form a fired laminate.

In another aspect, the invention provides an MLCC structure, comprising: a plurality of alternating electrode and dielectric layers; wherein the dielectric layers comprise a sintering aid or a phase enriched in sintering aid; wherein the dielectric layers have a thickness, an interior and two surface regions and an interior region sandwiched between the two surface regions; wherein each of the surfaces contact the electrode layers and are defined to have a thickness that is 20% of the thickness of the dielectric layer; wherein the sintering aid or phase enriched in sintering aid is unevenly distributed in the dielectric layers such that the concentration of sintering aid or phase enriched in sintering aid is higher in the surface regions than in the interior region. In some embodiments, the structure may comprise one or any combination of the following: wherein the concentration of sintering aid or phase enriched in sintering aid is at least 10% or at least 20% higher in the surface regions than in the interior region; comprising at least 4 electrode layers and 4 dielectric layers.

In another aspect, the invention provides an intermediate structure for making an MLCC, comprising: a plurality of alternating dielectric green layers and electrode green layers; the dielectric green layers comprising particles of dielectric material or materials; the electrode green layers comprising particles of a metal that is essentially free of titanium and comprising a coating consisting essentially of a rare earth oxide. In some embodiments, the metal is selected from the group consisting of Zn, Al, and Cu; in some embodiments, the metal consists essentially of Cu and the coating consists essentially of $Y_2O_3$. Preferably, the coating is applied by ALD. The invention also includes a method of making an MLCC, comprising: heating the intermediate structure and sintering the structure to form a fired laminate, wherein the heating and sintering steps occur in the presence of oxygen. The invention also includes a MLCC made by the method.

In a further aspect, the invention provides a powder composition, comprising: particles each having a pyrophoric metal core; a coating composition that renders the particles non-pyrophoric; wherein at least 90% of the particles, by number, have a particle size of 20 μm or less; wherein the coating composition has a calculated thickness of 1.5 nm or less or 1 nm or less, or between 0.5 and 1.5 nm. In some preferred embodiments, at least 90% of the particles, by number, have a particle size of from 2 to 20 μm; or 2 to 10 μm. In some embodiments, the coating composition is applied by ALD or MLD. These techniques produce a distinctive structure that can be distinguished over other coating methods. In some embodiments, the mass of oxygen in the powder, in the form of an oxide of the metal core, is less than the mass of the coating composition preferably at least 40% less, or at least 60% less, or at least 80% less, or in the range of 40 to 95% less.

In any of the inventive methods, the core particles can be subjected to a reductive treatment to remove surface oxide prior to the ALD or MUD treatment.

In another aspect, the invention provides a method of making oxidation-resistant metal particles, comprising: optionally applying a vacuum to the metal particles to desorb water; exposing the metal particles about 25 to 100 or 25 to 50 alternating cycles of TMA and $H_2O$.

A preferred metal comprises AlSi10Mg.

In another aspect, the invention provides a method of making oxidation-resistant metal particles, comprising: optionally applying a vacuum to the metal particles to, desorb water; exposing the metal particles to 10 to 100 alternating cycles of ALD or MLD. In some embodiments from 10 or 20 or 25 cycles to 30 or 40 or 60 or 80 alternating cycles of ALD or MLD. In some preferred embodiments, the alternating cycles comprise titanium chloride or a titanium alkoxide and water. In some preferred embodiments, the alternating cycles deposit a rare earth oxide.

In a further aspect, the invention provides a method of making stabilized $BaTiO_3$ particles, comprising providing $BaTiO_3$ particles and coating the particles with alternating cycles of ALD to make a titania coating. In some preferred embodiments, the titania coating has a calculated thickness of 1.5 nm or less or 1 nm or less, or between 0.5 and 1.5 nm.

In any of the inventive aspects, the particles can be coated with a titania coating having a calculated thickness of 0.3 to 4.5 nm, in some embodiments 0.3 to 0.5 nm or 3.5 to 4.5 nm.

In another aspect, the invention provides a powder composition, comprising: coated particles having a metal core and a coating composition; wherein the coated particles have a metal core to coating composition mass ratio that corresponds to a coating on the metal particles of 2 nm or less, or 1.5 nm or less, or 1.0 nm or less, or 0.5 to 2.0 nm, or 0.8 to 1.5 nm; wherein the powder composition has a first sintering temperature; and wherein an otherwise identical powder composition without the coating composition has a second sintering temperature; wherein the first temperature is at least 50, or at least 75, or at least 100, or from 50 to 200, or from 75 to 150, or 75 to 125° C. greater than the second temperature.

In some preferred embodiments, at least 10, or at least 20, or at least 50, or at least 70, or at least 90 mass %, or substantially all of the particles comprise the metal core. "Substantially" means that either all of the particles have been subjected to a coating treatment or at least 98 mass % of the particles show at least partial coating with the coating composition when observed by electron microscopy. In some embodiments, between 20 and 80 mass % or between 40 and 60 mass % of the particles comprise the metal core. In some embodiments, the coated particles have a mass average size distribution of from 30 to 200 nm, or 50 to 150 nm, or 60 to 100 nm. In some embodiments, the coated particles have a mass average size distribution of from 30 to 200 nm, or 50 to 150 nm, or 60 to 100 nm.

The sintering temperature of the otherwise identical composition can be easily obtained if the particles making up the composition (including the uncoated metal particles) are available. If the particles making up the powder composition are not readily available, they can be reproduced from particles matched to the same composition and particle size distribution. The scientist or engineer of ordinary skill working in this area of technology can, without undue experimentation, identify appropriate matching compositions and particle size distributions; typically within ±10% or ±20% of the composition and size properties.

The invention also includes articles comprising at least one component made from the powder compositions described herein. Throughout the descriptions, powder compositions are preferably coated by ALD or MLD.

In another aspect, the invention provides a powder composition, comprising at least 20 mass % of coated first particles having a metal core and a coating composition and at least 20 mass % of second particles; wherein the first and second particles have different compositions; wherein the second particles have a sintering temperature that is at least 50, or at least 75, or at least 100, or from 50 to 200, or from 75 to 150, or 75 to 125° C. greater than the sintering temperature of the metal core of the first particles; and wherein the coated first particles having a metal core and a coating composition have a sintering temperature that is at least 50, or at least 75, or at least 100, or from 50 to 200, or from 75 to 150, or 75 to 125° C. greater than the sintering temperature of the metal core of the first particles. The second particles can be coated or uncoated.

The invention also includes methods of fabricating a MLCC, comprising forming a slurry or paste comprising any of the powder compositions described herein, forming a shaped article from the slurry or paste; optionally burning out a binder from the shaped article; and sintering the shaped article. The invention also includes inks (and methods of using the inks) comprising $BaTiO_3$ particles coated with titanium oxide ($TiO_2$) by atomic layer deposition; preferably have a measured or calculated titanic thickness of 1 nm or less. These inks are characterizable by a solids concentration of at least 25 or at least 50 or at least 75 weight % and the ability to maintain (within ±20% or within ±10% or within ±5%) a ASTM D2270 viscosity index at a at least 10 wt % higher solids loading than an otherwise identical composition of the uncoated $BaTiO_3$.

In a further aspect, the invention provides a stabilized zirconia powder, comprising: particles comprising a zirconia core that is stabilized with yttria; a yttria coating disposed over the core; wherein the yttria coating comprises at least 20%, at least 40%, at least 50% and up to about 63% Y. Preferably, the yttria coating is applied by ALD. The powder may further comprise an alumina sintering aid.

In another aspect, the invention provides a method of making a dielectric component, comprising: pressing a powder into a green body; subjecting the green body to an ALD or MLD treatment to deposit a sintering aid on the surface of particles in the interstices within the powder; heating the treated green powder to form a sintered dielectric component. In a preferred embodiment, the powder comprises (or consists essentially of) $BaTiO_3$ and the sintering aid comprises (or consists essentially of) LiF.

The invention also includes an intermediate or final structure made from any of the methods of the invention.

In some embodiments, the invention provides as an intermediate structure, comprising; dielectric particles in contact with each other through points of contact; a sintering aid coating over the particles; wherein the sintering aid coating has a thickness and wherein the thickness is zero or very small at or near the points of contact and relatively thicker on surfaces of the particles away from the points of contact. In a preferred embodiment, the particles comprise (or consist essentially of) $BaTiO_3$ and the sintering aid comprises (or consists essentially of) LiF.

In another aspect of the present invention, the use of ALD or MLD can be used to fill or repair very small defects in the films prior to the finish of the films. An ALD film of the dielectric layer or the metal layer could fill in cracks or defects in the as-deposited layers.

In a further aspect, the invention provides an intermediate structure for making an MLCC, comprising: a plurality of alternating dielectric green layers and electrode green layers; the dielectric green layers comprising particles of dielectric material or materials; the electrode green layers comprising particles of electrode materials coated with a sintering aid (preferably coated by ALD); and wherein the powders of dielectric materials are not coated with the sintering aid. The sintering aid has the ability, at sufficiently high temperature, to migrate from the electrode layer into the dielectric layer where it aids in the sintering of the dielectric layers. The intermediate (or green) structure may further include powdered sintering aid; for example, a powdered sintering aid dispersed in the dielectric layers. Some preferred sintering aids, either as powders or coatings (preferably applied by ALD) include cations of Si, Li, B, Zn, Ti, Al, Bi and/or Y, in the form of an oxide, nitride, metal, semi-metal, metalloid, sulfide or halide, or combinations thereof. The invention also includes a method of sintering the intermediate structure, comprising: heating the intermediate structure to a temperature sufficient for the sintering aid to migrate into the dielectric layers; and sintering the structure to form a fired laminate.

In a further aspect, the invention provides an MLCC structure, comprising: a plurality of alternating electrode and dielectric layers; wherein the dielectric layers comprise a sintering aid or a phase enriched in sintering aid; wherein the dielectric layers have a thickness, an interior and two surface regions and an interior region sandwiched between the two surface regions; wherein each of the surfaces contact the electrode layers and are defined to have a thickness that is 20% of the thickness of the dielectric layer; wherein the sintering aid or phase enriched in sintering aid is unevenly distributed in the dielectric layers such that the concentration of sintering aid or phase enriched in sintering aid is higher in the surface regions than in the interior region. In some embodiments, at least 10% or at least 20% higher. In some embodiments, there are at least 4 electrode layers and 4 dielectric layers. For purposes of the foregoing aspect, the phrase "sintering aid or a phase enriched in sintering aid" includes a sintering aid or an artifact of a sintering process that can be identified by elemental analysis. In other words, the presence of a "sintering aid or a phase enriched in sintering aid" can be identified by the presence of sintering aid element(s) left over after a reaction or dispersion in a dielectric composition.

Glossary

Throughout this disclosure the term "ALD" may include "MLD" in broader aspects of the invention and atomic layer (single atom layer) addition or etch in some preferred embodiments. The techniques used to form ALD coatings on particles include those techniques developed at the University of Colorado, Forge Nano and it's precursor Pneumatic Technologies, and ALD NanoSolutions.

"Pyrophoric" means that the powder spontaneously ignites when exposed to 10% humidity in air at standard conditions. "Non-pyrophoric" means that the powder does not spontaneously ignites when exposed to 20% humidity in air at standard conditions. "Calculated thickness" is based on the thickness that would be present if the composition uniformly and densely coats the particles, based on the stoichiometry of the coating composition. Based on the chemical composition (and other characterizing data, such as surface analysis, if available) the worker of ordinary skill in this technology can distinguish between oxygen in the metal core and oxygen in the coating.

The invention is sometimes described using the term "comprising" which means including; and in any of the inventive concepts the term "comprising" may, in narrower embodiments, be replaced by "consisting essentially of" to exclude elements that would substantially degrade the properties of a layer, or, in the narrowest embodiments as "consisting of."

DESCRIPTION OF THE INVENTION

MLCC devices and intermediates for devices can be made by laminating sheets of dielectric particles with layers of conductive particles. According to methods of the present invention, either the dielectric particles or the conductive particles, or both, are coated with material by ALD methods prior to depositing in sheets or layers. A sheet typically has dimensions of width and length that are tens or hundreds or more times as great as thickness. Thickness of each dielectric layer is about 5 µm or less, or 4 µm to 0.3 µm, or 4 µm to 0.5 µm. Electrode layers are typically about the same or, more typically, thinner than the dielectric layers. For the electrode layers, conductive particles are deposited in films onto the green (unfired) ceramic sheets. Typically, this is done by screen printing with inks of conductive particles.

Any of the powder compositions of the present invention can be utilized, in known fabrication processes. For example, a slurry created by combining the uncoated or coated raw material powder and a binder, followed by the production of a thickness-controlled greensheet via a doctor blade. Following drying and sanding under identical conditions (temperature, time and fineness of grind), both sets of greensheets exhibited uniform thickness and no scratching, evidence that the coated materials do not promote agglomeration of the underlying material and may be used as a drop-in replacement for MLCC fabrication using existing processing steps.

Fine particles can be dispersed into liquids to make an ink to print the materials. The inks are stabilized with one or more additives to maintain the dispersion by controlling the pH, viscosity, zeta potentials and other properties of the finished ink. These additives can include compounds like ethyl alcohol, sodium acetate, hydroxypropyl methyl cellulose, polyethyleneimine among many other options. The exact composition of the ink will be determined by the method for the deposition of the metal film and the final properties desired in the film. However, the additives either need to be removed prior to the film sintering, which can cause pores in the film, or need to be compatible with the composition desired of the final film. The use of ALD or MLD (Molecular Layer Deposition) films to modify the particles before making the inks could have many benefits. The ALD or MLD film can aid in the formation of a stable dispersion which provides the optimal dispersion with the minimum of additives. This will provide films with higher purity composition and fewer pores, flaws or cracks.

1. General Description of Atomic or Molecular Layer Deposition

Atomic layer-controlled growth techniques permit the deposition of coatings of about 0.1 to about 5 angstroms in thickness per reaction cycle, and thus provide a means of extremely fine control over surface coverage or coating thickness. Thicker coatings can be prepared by repeating the reaction sequence to sequentially deposit additional layers of the coating material until the desired coating thickness is achieved.

The coating is deposited in an Atomic Layer Deposition (ALD) or Molecular Layer Deposition (MLD) process. In the ALD/MLD process, the coating-forming reaction is conducted as a series of (typically) two half-reactions. In each of these half-reactions, a single reagent (precursor) is introduced into contact with the substrate surface. Conditions are such that the reagent is in the form of a gas. In most cases, the reagent reacts with functional groups on the surface of the particle and becomes bound to the particle. Because the reagent is a gas, it permeates into pores in the substrate and deposits onto the interior surfaces of the pores as well as onto the exterior surfaces of the substrate. This precursor is designed to react with the surface at all of the available surface sites but not react with itself. In this way, the first reaction occurs to form a single monolayer, or sub-monolayer, and creates a new surface functionality. Excess amounts of the reagent are then removed, which helps to prevent the growth of undesired, larger inclusions of the coating material. Each remaining half-reaction is then conducted in turn, each time introducing a first reagent, allowing it to react at the surface of the particle, and removing excess reagent before introducing the next reagent. Usually, an inert carrier gas is used to introduce the reagents, and the reaction chamber is usually swept with the carrier gas between successive reagent introductions to help remove excess reagents and gaseous reaction products. A vacuum may be pulled during and between successive dosings of reagents, to further remove excess reagents and gaseous reaction products.

After exposure to the first precursor, the surface is then exposed to the second precursor, also typically dispersed in an inert carrier gas. This precursor is designed to react with the functional groups put down in the first reaction step. This reaction also happens until all of the available surface sites are reacted. The second precursor also does not react with itself. Any excess of the second precursor is also removed in an optional inert gas purge step. If the gases are metered properly, the purge step may be unnecessary. This may be at least a 4 step process (precursor 1, purge, precursor 2, purge) to deposit one monolayer of the film which is being grown. This process is repeated as many times as is necessary to build up the desired film thickness. The ALD/MLD process may start with a "linker" agent, or pre-treatment gas (such as ozone), that facilitates covalent bonding to the surface, or it may end with a terminating agent that may be hydrophobic, hydrophilic, or otherwise engineered for a specific purpose.

For purposes of the present invention, the ALD/MLD process may include only a half reaction, rather than a full cycle. However, at least one full cycle is preferred, more preferably at least five cycles.

A convenient method for applying the coating to a particulate substrate is to form a fluidized or otherwise agitated bed of the particles, and then pass the various reagents in turn through the fluidized bed under reaction conditions. Methods of fluidizing particulate materials are well known, and generally include supporting the particles on a porous plate or screen. A fluidizing gas is passed upwardly through the plate or screen, lifting the particles somewhat and expanding the volume of the bed. With appropriate expansion, the particles behave much as a fluid. Reagents (in gaseous, liquid, or solid phase) can be introduced into the bed for reaction with the surface of the particles. Liquid or solid reagents convert to gaseous form once inside the bed prior to reaction with particles. In this invention, the fluidizing gas also can act as an inert purge gas for removing unreacted reagents and volatile or gaseous reaction products. In addition, the reactions can be conducted at particle surfaces in a rotating cylindrical vessel, a rotating tube, or a vibrating bed. This vibrating bed method is particularly suitable for continuous processes.

Reaction conditions are selected mainly to meet three criteria. The first criterion is that the reagents are gaseous under the conditions of the reaction. Therefore, temperature and pressure conditions are selected such that the reactants volatilize before reaction. The second criterion is one of reactivity. Conditions, particularly temperature, are selected such that the desired reaction between the film-forming reagents (or, at the start of the reaction, the first-introduced reagent and the particle surface) occurs at a commercially reasonable rate. The third criterion is that the substrate is thermally stable, from a chemical standpoint and from a physical standpoint. The substrate should not degrade or react at the process temperature, other than a possible reaction on surface functional groups with one of the ALD precursors at the early stages of the process. Similarly, the substrate should not melt or soften at the process temperature, so that the physical geometry, especially pore structure, of the substrate is maintained. The reactions are generally performed at temperatures from about 270 to 1000 K, preferably from 290 to 450 K, with specific temperatures in each case being below the temperature at which the substrate melts, softens or degrades.

Between successive closings of the reagents, the particles are subjected to conditions sufficient to remove reaction products and unreacted reagents. This can be done, for example, by subjecting the particles to a high vacuum, such as about $10^{-5}$ Torr or greater, after each reaction step. Another method of accomplishing this, which is more readily applicable for industrial application, is to sweep the particles with an inert purge gas between the reaction steps. This purge gas can also act as a fluidizing medium for the particles and as a carrier for the reagents.

Several techniques are useful for monitoring the progress of the reaction. For example, vibrational spectroscopic studies can be performed using transmission Fourier transform infrared techniques. The deposited coatings can be examined using in situ spectroscopic ellipsometry. Atomic three microscopy studies can be used to characterize the roughness of the coating relative to that of the surface of the substrate. X-ray photoelectron spectroscopy and x-ray diffraction can be used to do depth-profiling and ascertain the crystallographic structure of the coating.

Aluminum oxide coatings are conveniently deposited using trimethylahuninum and water as the precursors, as illustrated by reaction sequence A1/B1. The illustrated reactions are not balanced, and are only intended to show the reactions at the surface of the substrate (i.e., not inter- or intralayer reactions).

Substrate-XH*+Al(CH$_3$)$_3$=Substrate-X-Al*-CH$_3$+CH$_4$ (precursor reaction)

Substrate-X-Al*-CH$_3$+H$_2$O=Substrate-X-Al-OH*+CH$_4$ (A1)

Substrate-X-Al-OH*+Al(CH$_3$)$_3$=Substrate-X--Al-O-A-l*-CH$_3$+CH$_4$ (B1)

In reactions A1/B1, X is typically oxygen, nitrogen or sulfur, and the asterisk (*) represents the surface species at which the next half-reaction can occur. An aluminum oxide film is built up by repeating reactions A1 and B1 in alternating fashion, until the desired coating thickness is achieved. Aluminum oxide films tend to grow at a rate of approximately 0.1 nm/cycle using this reaction sequence.

Titanium oxide coatings are conveniently deposited using titanium tetrachloride and water and/or hydrogen peroxide as the precursors, as illustrated by reaction sequence A2/B2. As before, the illustrated reactions are not balanced, and are only intended to show the reactions at the surface of the particles (i.e., not inter- or intralayer reactions).

Substrate-XH*+Ticl$_4$=Substrate-X--Ti*-Cl$_3$+HCl (precursor reaction)

Substrate-X--Ti*-Cl$_3$+H$_2$O$_2$=Substrate-X-T-i*-OH+HCl+Cl$_2$ (A2)

Substrate-X-Ti*-OH+TiCl$_4$

Substrate-X-Ti-O-Ti*-Cl$_3$+-HCl (B2)

In reactions A2/B2, X is typically oxygen, nitrogen or sulfur, and the asterisk (*) represents the surface species at which the next half-reaction can occur. A titanium oxide film is built up by repeating reactions A2 and B2 in alternating fashion, until the desired coating thickness is achieved. Titanium oxide films tend to grow at a rate of approximately 0.05-0.1 nm/cycle using this reaction sequence.

As is known for ALD/MLD processes, the order can be AB, ABC, ABCD, ABCDABABCD, or any desired order provided that the chemical entities react with each other in the desired order. Each of the reactants has at least two reactive moieties (this includes the possibility that the reactant is modifiable to have two reactive moieties such as having a first reactive moiety and a second reactive moiety that is temporarily blocked by a protecting group or requires activation for subsequent reaction such as UV activation). In some preferred embodiments, the reactants have exactly two reactive moieties since higher numbers of reactive groups may lead to lower packing density. In some preferred embodiments, the films have at least three repeating units (e.g., ABABAB), or at least 5, or at least 10, or at least 50, and sometimes in the range of 2 to 1000, or 5 to 100. By "reactive" it is meant under normal MLD conditions and commercially relevant timescales (for example, at least 50% reacted within 10 hours under appropriate reaction conditions). For control of film quality, the reactants may be singly reactive during each step of the MLD process to avoid reacting twice to the surface, and the reactants should not self-react and condense onto the surface.

In some preferred embodiments, the reactive moieties for Reactant A may comprise: isocyanates (R-NCO), acrylates, carboxylic acids, esters, epoxides, amides and amines, and combinations thereof. In some preferred embodiments, Reactant A comprises a diisocyanate, a diacrylate, a dicarboxylic acid, a diester, diamide or a diamine. In some preferred embodiments, the reactive moieties on Reactant B comprise: alcohols or amines, and combinations thereof. In some preferred embodiments, Reactant B comprises a diol, an amine alcohol, or a diamine.

In some cases, especially for MLD, the vapor phase reactants are selected react only monofunctionally with the substrate or growing polymer chain, i.e., only one group or moiety on the vapor phase reactant is capable of reacting with the substrate or growing polymer chain under the conditions of the reaction. This prevents unwanted cross-linking or chain termination that can occur when a vapor phase reactant can react polyfunctionally. A reactant is considered to react "monofunctionally" if during the reaction the reactant forms a bond to only one polymer chain, and does not self-polymerize under the reaction conditions employed. As explained more fully below, it is possible in certain embodiments of the invention to use a vapor phase reactant that can react difunctionally with the substrate or growing polymer chain, provided that the vapor phase reactant contains at least one additional functional group. Reactants that have exactly two functional groups which have approximately equal reactivity are preferably avoided in this aspect of invention.

A first class of suitable vapor phase reactants are compounds having two different reactive groups, one of which is reactive with a functional group on the substrate or polymer chain and one of which does not readily react with a functional group on the polymer chain but is reactive with a functional group supplied by a different vapor phase reactant. Examples of reactants of this class include:

a) Hydroxyl compounds having vinyl or allylic unsaturation. These can react with a carboxylic acid, carboxylic acid halide, or siloxane group to form an ester or silicone-oxygen bond and introduce vinyl or allylic unsaturation onto the polymer chain. Alternatively, the unsaturated group can react with a primary amino group in a Michaels reaction to extend the polymer chain and introduce a hydroxyl group onto the chain.
b) Aminoalcohol compounds. The amino group can react with a carboxyl group, a carboxylic acid chloride, a vinyl or allylic group, or an isocyanate group, for example, to extend the polymer chain and introduce a hydroxyl group onto the chain. Alternatively, the hydroxyl group can react with a siloxane species to form a silicon-oxygen bond and introduce a free primary or secondary amino group.

A second class of suitable vapor phase reactants includes various cyclic compounds which can engage in ring-opening reactions. The ring-opening reaction produces a new functional group which does not readily react with the cyclic compound. Examples of such cyclic compounds include, for example:
  a) Cyclic azasilanes. These can react with a hydroxyl group to form a silicon-oxygen bond and generate a free primary or secondary amino group.
  b) Cyclic carbonates, lactones and lactams. The carbonates can react with a primary or secondary amino group to form a urethane linkage and generate a free hydroxyl group. The lactones and lactams can react with a primary or secondary amino group to form an amide linkage and generate a free hydroxyl or amino group, respectively.

A third class of vapor phase reactants includes compounds that contain two different reactive groups, both of which are reactive with a functional group on the polymer chain, but one of which is much more highly reactive with that functional group. This allows the more reactive of the groups to react with the functional group on the polymer chain while leaving the less reactive group unreacted and available for reaction with another vapor phase reactant.

A fourth class of vapor phase reactants includes compounds that contain two reactive groups, one of which is blocked or otherwise masked or protected such that it is not available for reaction until the blocking, masking or protective group is removed. The blocking or protective group can be removed chemically in some cases, and in other cases by thermally decomposing the blocking group to generate the underlying reactive group, by radiating the group with visible or ultraviolet light, or in a photochemical reaction. The unprotected group may be, for example, an amino group, anhydride group, hydroxyl group, carboxylic acid group, carboxylic anhydride group, carboxylic acid ester group, isocyanate group and the like. The protected group may be one which, after removal of the protective group, gives rise to a functional group of any of the types just mentioned.

A reactant of this fourth class may, for example, have a hydroxyl group protected by a leaving group such as a benzyl, nitrobenzyl, tetrahydropyranyl, —$CH_2OCH_3$ or similar group. In these cases, the hydroxyl group can be deprotected in various ways, for example by treatment with HCl, ethanol, or in some cases irradiation. Carboxyl groups can be protected with leaving groups such as —$CH_2SCH_3$, t-butyl, benzyl, dimethylamino and similar groups. These groups can be deprotected by treatment with species such as trifluoroacetic acid, formic acid, methanol or water to generate the carboxylic acid group. Amino groups can be protected with groups such as R—OOC—, which can be removed by reaction with trifluoroacetic acid, hydrazine or ammonia. Isocyanate groups can be protected with carboxyl compounds such as formic acid or acetic acid.

A fifth class of vapor phase reactants contains a first functional group, and a precursor group at which a further reaction can be conducted to produce a second functional group. In such a case, the first functional group reacts to bond to the polymer chain, and chemistry is then performed at the precursor group to generate a second functional group. The first functional group can be any of the types mentioned before, including a siloxane group, amino group, anhydride group, hydroxyl group, carboxylic acid group, carboxylic anhydride group, carboxylic acid ester group, isocyanate group and the like. A wide variety of precursor groups can be present on this type of reactant.

The precursor group may be one that it does not itself react with the polymer chain, but it can be converted to a functional group that can, react with another vapor phase reactant to grow the chain. Two notable types of precursor groups are vinyl and/or allylic unsaturation, and halogen substitution, especially chlorine or bromine. Vinyl and allylic unsaturation can be converted to functional groups using a variety of chemistries. These can react with ozone or peroxides to form carboxylic acids or aldehydes. They can also react with ammonia or primary amino to produce an amine or imine. Halogens can be displaced with various functional groups, They can react with ammonia or primary amine to introduce an amino group, which can in turn be reacted with phosgene to produce an isocyanate group, if desired.

Reactants that are used to convert a precursor group to a functional group or to demask or deprotect a functional group, are introduced in the vapor phase. Excess reactants of this type are removed prior to the introduction of the next reactant, typically by drawing a high vacuum in the reaction zone, purging the chamber with a purge gas, or both. Reaction by-products are removed in the same manner, before introducing the next reactant into the reaction zone In some preferred embodiments at least one or all of the reactants in the MLD repeating units have chain lengths between reactive moieties of from 2 to 20 atoms (typically carbon atoms although heterogroups such as oxygen may be present), or from 2 to 10 atoms, or from 2 to 5 atoms. In some preferred embodiments, the reactants have straight chains (i.e., no branching) between reactive moieties to enhance packing density. In some preferred embodiments, the chains between reactive moieties are non-reactive; however, in some embodiments, there may be moieties within the chains that are capable of cross-linking to adjacent chains. In some embodiments, the capping layer and/or the MLD layers at or very near the surface (e.g., within 5 cycles or within 2 cycles of the capping layer or surface) are branched for enhanced hydrophobicity.

An inorganic layer applied to the particle in a first step preferably becomes covalently bonded to the substrate. Covalent bonding can occur when the first-to-be-applied precursor compound reacts under the conditions of the atomic layer deposition process with a functional group on the surface of the substrate. Examples of such functional groups are, for example, hydroxyl, carbonyl, carboxylic acid, carboxylic acid anhydride, carboxylic acid halide, primary or secondary amino.

Some ALD coatings are aluminum oxide and/or titanium oxide coatings. "Aluminum oxide" is used herein to designate a coating that is made up substantially entirely of aluminum and oxygen atoms, without reference to the specific stoichiometry. In many cases, it is expected that an aluminum oxide coating will correspond somewhat closely to the empirical structure of alumina, i.e., $Al_2O_3$, although deviations from this structure are common and may be substantial. "Titanium oxide" is used herein to designate a coating that is made up substantially entirely of titanium and oxygen atoms, without reference to the specific stoichiometry. In most cases, it is expected that a titanium oxide coating will correspond closely to the empirical structure of titania, i.e., although deviations from this structure are common and may be substantial. Similarly, considerations apply to understanding the other formulations described herein; although in some embodiments, the invention can be more specifically defined by the use of terms such as "consisting."

Except for the case of a half-reaction included in the broader aspects of the present invention, the atomic layer deposition process is characterized in that at least two different reactants are needed to form the coating layer. The reactants are introduced into the reaction zone individually, sequentially and in the gas phase. Excess amounts of reactant are removed from the reaction zone before introducing the next reactant. Reaction by-products are removed as well, between successive introductions of the reagents. This procedure ensures that reactions occur at the surface of the substrate, rather than in the gas phase.

A purge gas is typically introduced between the alternating feeds of the reactants, in order to further help to remove excess reactants. A carrier gas, which is usually but not necessarily the same as the purge gas, generally (but not always necessarily) is introduced during the time each reactant is introduced. The carrier gas may perform several functions, including (1) facilitating the removal of excess reactant and, reaction by-products and (2) distributing the reactant through the reaction zone, thereby helping to expose all surfaces to the reactant. The purge gas does not react undesirably with the ALD reactants or the deposited coating, or interfere with their reaction with each other at the surface of the substrate.

Temperature and pressure conditions will depend on the particular reaction system, as it remains necessary to provide gaseous reactants. As is known for ALD/MLD processes, the temperature should be high enough to enable reactants in the gas phase but not so high that the product degrades.

2. Particle and Coating Characteristics

The core particles, in some embodiments are metallic and preferably comprise one or more transition metal, alkali metal, alkali earth metal, post-transition metal, or semi-metal elements. Preferred elements include: copper, aluminum, tantalum, silicon, cobalt, nickel, silver, platinum, palladium, gold, indium, tin, gallium and germanium, and alloys of any of these elements. In some preferred embodiments, the particles, either individual particles within a mixture or the sum of all particles in a mixture comprise at least 80 mass % or at least 90 mass % of a single element. The electrodes can also be formed from conductive ceramic particles.

For the dielectric layer, the particles are typically ceramic, for example, oxides, nitrides, and carbides, or mixtures thereof. For purposes of the present invention, the core particles have a surface (or are coated with a layer which has a surface) that reacts under conditions of ALD or MLD to form a surface layer. In some preferred embodiments, the surface that reacts under conditions of ALD or MLD is a metal or metal oxide surface. For purposes of the present invention, metals may include semi-metals.

The particles, including any coating, have diameters typically in the range of 10 to 500 nm; preferably 10 to 300 nm; preferably 10 to 100 nm; or 30 to 200 nm, and in some embodiments, at least 90 mass % of the particles have a diameter of 200 nm or less or 100 nm or less or in the ranges discussed. For asymmetric particles, particle size is typically determined by optical microscopy based on the smallest dimension through the center of a particle.

The core particles preferably possess one or more of the following characteristics: spherical, spherical with satellites, identical chemical composition, little or no internal porosity, and/or low surface contamination. Satellites are nodules on the exterior of larger (usually spherical) particles. Satellites are typically formed during the production of the core metal particles, especially during the production of these materials from gas atomized processes. When gas atomization is used, the particles are produced in a range of sizes which coalesce together. The satellites are the relatively small particles which attach to the larger particles during the production.

The coating may comprise any coating that can be applied by molecular or atomic layer deposition. Some well-known coatings that can be applied to the metallic or other material core particle may comprise: oxides or mixed oxides (e.g., $Al_2O_3$, $TiO_2$, ZnO, $ZrO_2$, $SiO_2$, $HfO_2$, $Ta_2O_5$, $LiNb_xO_y$), nitrides (e.g., TiN, TaN, $W_2N$, $TiY_2N$), sulfides (e.g., ZnS, CdS, SnS, $WS_2$, $MoS_2$, $ZnIn_2S_4$), and phosphides (e.g., GaP, InP, $Fe_{0.5}Co_{0.5}P$). Some lesser known materials that can be applied to the core particle may comprise: metal fluorides (e.g., $AlF_3$, $MgF_2$, $ZnF_2$), oxy fluorides and oxy nitrides of transition metals (e.g. of Al, Cu, Co, W, Cr, Fe, Zn, Zr, Pt, Pd), lanthanides in either elemental, oxide, fluoride, nitride, boride, or sulfide form (e.g., Y, YN, $La_2O_3$, $LaF_3$, Nb, $Dy_2O_3$, Nd, $LaB_6$, $La_2S_3$ etc), borides (e.g., $TiB_2$), carbides (e.g., $B_4C$, WC), silanes, silicides and other silicon containing materials, carbon-containing materials including, but limited to, polymers (e.g., polyamides, polyethylenes, polyamides, polyureas, polyurethanes), hydrocarbons, polymers or fragments of amino acids or other biological-related molecules and polymers, and other materials), fluorinated polymers (e.g., fluoro or perfluoro- polyamides, -polyethylenes, -polyamides, -polyureas, -urethanes, -hydrocarbons). This coating is highly uniform over the particle; preferably, there is no more than a 20%, more preferably no more than 10%, or no more than 5% variation in coating thickness over the surface of the particle. This high level of uniformity is a characteristic of the ALD/MLD process. Particles coated by ALD/MLD are distinguishable from particles coated by other methods by 1) the uniformity of film thickness and 2) the lack of change in particle size distribution of the individual core particles, which are not possible with other techniques.

Coatings, on core powders, typically have a thickness in the range of 0.1 to 100 nm; preferably 0.2 to 50 nm; more preferably 0.5 to 10 nm, or 0.2 nm to 2 nm. Coating thickness can be measured by transmission electron microscopy (TEM).

The ALD/MLD coating preferably covers at least 60% of the surface, more preferably at least 80%, more preferably at least 95% and still more preferably at least 99% of the surface area of the particles.

The ALD/MLD coating preferably is conformal. By "conformal", it is meant that the thickness of the coating layer is relatively uniform across the surface of the particle (so that, for example, the thickest regions of the coating are no greater than 3 times, preferably not greater than 2 times, in some embodiments not greater than 20% thicker than the thickness of the thinnest regions).

3. Rheology

Most fine metal and ceramic powders do not flow perfectly. When a layer of powder or composition of powder and additives is added to make a layer, if it does not flow well, defects in the layer can result from voids in the powder. The powder layer is optimally a dense bed of powder which is 30-100 μm thick. The present invention provides a method for increasing the flowability of metal powders. This invention, in some embodiments, improves the flowability of the powder to reduce voids in the bed and lower defects in the final part.

Powder size has a significant effect on the rheology of the particles as well. Smaller powders tend to be more cohesive (sticky) and result in less reliable spreading, shaking or otherwise moving the powder to form layers. Additionally, smaller powders, especially of metals and non-oxide ceramics, typically have a higher oxygen content that tends to predominate on the surface. When the oxygen is included it changes the composition of the finished part, typically in a negative way. However, smaller powders allow for finer feature sizes as well as a smoother surface finish to the finished part. This invention, in some embodiments, allows for use of smaller metal or non-oxide ceramic particles without increasing oxygen content of finished parts.

The particle coating can be applied by alternating cycles according to the ALD process. Surprisingly, we have discovered that at least 5 cycles of the ALD process resulted in a substantial increase in flowability. Preferably, at least 10 cycles or at least 25 cycles of ALD are conducted for increased flowability and oxidation resistance. In some embodiments, the ALD process is conducted for no more than 50 cycles or no more than 100 cycles, above which has been found to have little additional effect.

In some preferred embodiments, the ALD coating comprises alumina.

In some embodiments, the ALD process increases flow factor by at least 10%, or at least 20%, or in the range of 5 to about 40%. Flow factor may be measured at a Major Principal Consolidation Stress of 5 or 10, preferably tested in a Brookfield Powder Flow Tester (PFT3115) equipped with a PFT-405 5" sample trough and a PFT-515 F" 304 SS vane lid. In some preferred embodiments of the invention, the coated powders can be described as having ±50%, or ±30%, or ±10% of any of the values that are shown in the Examples section; these values may be in conjunction with one or any combination of the other descriptions provided herein.

ALD and MLD processes produce unique physical properties. Powders that are coated by an ALD or MLD process can be identified, or alternatively, characterized, by their measurable properties; and, therefore, the particles are distinguishable from powders made by alternative methods. For example, by common spectroscopic methods. In some embodiments, the powder can be characterized by a flow factor of at least 10, or a flow factor in the range of 10 to 15, as measured according to the apparatus and conditions described above (also see the Examples).

4. Chemical Reaction Resistance

Some powders for making MLCCs can be prone to oxidation or absorption of water, leading to undesirable elemental composition or poor rheology characteristics. By coating with an $H_2O/O_2$— barrier coating (~10 nm or less), and optionally drying the powder in a vacuum, we can extend the shelf life of powders for making MLCCs.

Some preferred coating methods utilize one or more cycles of reaction with an oxidant source such as water, $H_2O_2$ or $O_3$, followed by reaction with trimethyl aluminum (TMA) or diethyl zinc (DEZ). More generally, a powder can be exposed to one or more dose of chemical (e.g., TMA) to modify surface groups and lower the strength of particle-particle interactions by, for example, changing an Al—OH surface to an Al—X surface where X may equal: $CH_3$, N, F, S, and others.

The coating can be, for example, a hydrophobic organic coating such as an imide or fluorinated organic; which could be deposited after one or more cycles of applying an inorganic coating.

The particles can be characterized as having a carbide, nitride, or organic coating. In addition, or alternatively, the particles can be characterized as having an average of less than 1 nm of oxide, of less than 0.5 nm of oxide, or substantially no oxide on the surfaces of the particles.

5. Formation of Cermets

A ceramic coating can be applied to metal powders to form a cermet. ALD can be used to coat a metal particle with a ceramic coating; the resulting powder can be printed into a desired shape in the form of a cermet—a composite material with metallic and ceramic phases. For example, 3D printing conditions can be controlled so that particles having an ALD applied coating (e.g., metal oxide, metal nitride or metal carbide) result in a printed composite having a respective phase (e.g., metal oxide, metal nitride or metal carbide phase) either dispersed in a metallic matrix.

6. Oxygen Inclusion Mitigation

Another aspect of this invention is the use of ALD/MLD techniques to add rare earth elements (REE) to a particle coating to bind oxygen. The oxygen in Al can exist in isolated islands or deposits of $Al_2O_3$; and advantageously, can form dense surface layers to protect the underlying metal. In titanium, the O is more soluble and tends to move toward the interior of a particle. The placement of a REE on the exterior of a particle will retard oxidation of the bulk metal. This will be especially useful for low melting temperature metals such as zinc or aluminum.

In some embodiments, carefully controlled coatings comprising rare earth oxides (oxides of Sc, Y, La, Ce, Pr, Nd, Pm, Sm, Eu, Gd, Tb, Dy, Ho, Er, Tm, Yb, Lu, or any combination of these elements) can be applied in a thin layer over particles of a metal or semimetal (as throughout this specification, the particles may be a single element or mixture of elements). Utilized in a MLCC, relative to other coatings, the rare earth oxide coating can provide substantial advantages such as enhanced oxidation resistance or superior capacitor performance.

As one example, yttrium oxide ($Y_2O_3$) can be deposited by ALD using several chemistries, including alternating exposures of tris (isopropylamidinate) yttrium and water, tris (methylcyclopentadienyl) yttrium and ozone, tris(2,2,6,6,-tetramethyl-3,5-heptanedionate) yttrium and oxygen. Deposition temperatures can range between 120° C. and 400° C.

Contemplated Example

A fine metal powder of copper (Cu) could be coated with a thin layer (for example, 2 nm) yttrium oxide ($Y_2O_3$) by atomic layer deposition. The particles could be heated in oxygen (or an oxygen/inert gas mixture) in a thermal gravimetric analyzer (TGA) up to 1000° C., which is just below the melting temperature of Cu. The TGA will measure the mass of the sample as a function of time (and temperature during a temperature programmed ramp). During the TGA experiment, the mass of the sample will increase when the powders are oxidizing. As compared to the uncoated fine particles, the $Y_2O_3$ coated materials will remain stable in the high temperature oxidizing environment to at least 100° C. higher temperature.

7. Surface Properties

ALD/MLD can be used to apply uniform surface coatings that reduce the surface tension of melt pools. In some embodiments these coatings are used to have a beneficial effect on the final microstructure of the part by affecting grain growth, precipitation and other microstructure-related properties. The coatings are especially advantageous because the surface-active elements or compounds can be concentrated on the particle exterior, there is better control of composition and the resulting printed article will have superior properties. Examples of such coatings include sulfur-containing materials (e.g., but not limited to: ZnS, CaS, BaS, SrS, CdS, PbS, $In_2S_3$, $Cu_xS$, $WS_2$, $TiS_2$, $Sb_2S_3$, SnS, $GaS_x$, GeS, $MoS_2$, $Li2_s$), Boron containing materials (e.g., not limited to $TiB_2$, $B_2O_3$, BN, TaB, $TaB_2$, B-doped ZnO, $W_2B_5$, $AlB_2$, $B_4C$, $Mo_2B_5$, $Re_2B_5$, $Os_2B_5$). Tantalum containing materials (TaN, TaB, tantalum oxides etc) and Nb-containing materials (e.g., niobium oxide, NbN,) Alternatively, the active 'coating' may be applied by just a surface treatment of the powder with an exposure of the metal powder to the element-of-interest-containing chemical (e.g., for B these could be, for example, $BBr_3$, Tetrakis(dimethylamino)diboron, $B(C_2H_5)_3$, $B(OCH_3)_3$ $[(CH_3)_2CHO]_3B$, $B(CH_3)_3$, $(C_6H_5)_3B$, for S this would be, for example, $H_2S$, and for Nb there are several options)

In another embodiment, the ALD coating, or a layer within a multi-material ALD coating, modifies grain growth, typically inhibiting grain growth but in some embodiments increasing grain growth for high temperature alloys, where grain slippage lead to weakness, so fewer grains are desirable and single crystal parts are often the best performing at extreme high temperatures.). Examples of such grain growth controlling coatings include the coating listed above as well as $AlPO_4$, $TiPO_4$, TiP, AlP, GaP, $Ni_2P$.

In some embodiments, the coating may function as a sintering aid. Because ALD forms a uniform and, typically, thin layer, the intermediates and product after sintering or other heat treatment has controlled properties at the interfaces between particles.

Hydrogen or forming gas can be used to reduce oxides during ALD deposition to create metal coatings, or to reduce oxide ALD coatings just prior to use. Especially with metal particles, if the surface oxide is removed, the particles have a tendency to aggregate (or sinter loosely).

8. Etching

In some embodiments, a coating layer or a contaminate film (for example, an unwanted surface oxide) can be removed prior to use, preferably immediately prior to use, such as by atomic layer etching (ALE). This process may be either true ALE (self-limiting by exposure) or spontaneous etching of surface material (such as spontaneous etching of an oxide from the surface of a metal powder upon exposure to HF gas). In some embodiments, this ALE or spontaneous etch process has the added benefit of modifying the original surface chemistry from, e.g., an oxide, to another surface chemistry, e.g., fluoride, oxifluoride. This new surface (if a fluoride) should be less hydrophilic than the original surface (e.g., if originally oxide/—OH surface). The less hydrophilic surface is beneficial to reduce the oxygen/$H_2O$ uptake by the film during storage, or during operation. The added advantage is also that the fluoride is often more thermodynamically stable than the oxide, so the fluoride will not convert back to the oxide.

In any of the inventive methods, the particles can be subjected to an etching step or reducing step prior to ALD/MLD.

9. Pyrophoric Resistance

Another use for the coatings is to protect flammable powders from ignition or reduce the pyrophoric nature of such powders. These powders may include fine metal powders which are pyrophoric below a certain particle size such as titanium, aluminum, iron or zinc powders, or especially pyrophoric powders such as hafnium, zirconium, tin, or alkali metals such as calcium and magnesium. While there are other techniques for encapsulating pyrophoric powders to prevent their oxidation or ignition, ALD is unique in its ability to encapsulate powders with a minimal amount of film material. Because of its inherent uniformity and coverage, the coated material will have the highest fraction of pyrophoric material by weight or volume, and the lowest fraction of barrier film when compared to similar coating materials deposited by other means. Coatings may also be used to prevent smoking (particles blowing around in printers due to thermal air currents). A film which optimizes the cohesion of the particles can be created with ALD films. These films create a balance between increased flowability of powders desired for reliable casting of each powder layer while providing a film which is just cohesive enough that the particles are less susceptible to smoking. The smooth and highly uniform nature of the ALD/MLD coatings enable excellent flowability while the molecular forces between particle coatings prevents smoking. Moreover, ALD/MLD is able to completely cover the surface with less material than other methods, enabling safe operation with superior results. Pyrophoric powders are generally recognized as, and in some embodiments can be defined as, having the ability to spontaneously ignite at 10% humidity and standard pressure.

Contemplated Examples

Pyrophoric metal particles can be the single metal element or can be a metal alloy powder such as AlSi10Mg, TiAl6V4 (Ti64). AlSi10Mg is defined as an aluminum alloy comprising 9-11% Si and 0.2 to 0.45% Mg. Ti64 is defined as a titanium alloy comprising 3.5 to 4.5% V and 4-8% or 5-7 or 5.5 to 6.8% Al. Percents are mass % unless specified otherwise.

Pyrophoric metal powders (such as mentioned above) may preferably have a particle size of 20 μm or less, in some embodiments in the range of 0.5 μm to 20 μm. Particle size preferably refers to at least 90% of the particles (by number of particles). Particle size distribution can be obtained via ASTM B822-17.

Pyrophoric metal powders may be synthesized, for example, by a gas atomization process. Following synthesis, and before exposure to oxygen/air, the powder can be coated with 10 or more cycles, and typically 25 or more cycles of ALD or MLD; in some embodiments up to 30, 40, 50, 75, or 100 cycles of ALD or MLD. In one preferred embodiment, alumina ALD is performed on the powder in a fluidized bed at 80° C. or more.

10. Mixing Enhancements

One problem in powder industries is creating uniform blending of powders. Powders often segregate due to mismatches in surface chemistry and particle size. Modifying the surface chemistry enhances intermixing of two or more powders and leads to better processing and part formation. Another method provided by the present invention is the application of identical coatings onto different particles to improve mixing. In one embodiment the same ALD coating is applied to two or more powders. In another embodiment, the coating is chosen to mimic the surface of one powder and is only applied to the second powder. Coatings off given material may be applied to one or more powders to create a better blended powder mix. For example, when trying to create a blend of powder X and Y, one could coat powder X with the surface chemistry present on Y. Thus, both powders would have the same surface chemistry and would mix better. A specific example would be coating W metal powder with a carbon coating such that, when the W metal powder is mixed with a carbon powder (to eventually make a WC part), the surface chemistry on all particles is C-based. Alternatively, one could readily modify the surface functional groups on the carbon to add $WO_x$ (tungsten oxide) functional groups on the surface of the carbon. This second approach would lead to $WO_x$ surface groups on all particles which, again, would lead to better mixing and less segregation. Thus, particles having different core compositions have substantially similar or identical surface chemistries to enable better mixing and less segregation prior to, or during, formation of a printed part. This concept expands to multiple material powders where the number of different powder materials is preferable 2-10, more preferably 2-5, or more preferably 2-3.

In another example, a carbon-containing coating applied over metal (e.g., tungsten) particles. When a W metal powder is mixed with a carbon powder (to eventually print a WC part), the surface chemistries on all particles is C-based. Alternatively, one could readily modify the surface functional groups on the carbon to add WOx (tungsten oxide) functional groups on the surface of the carbon. This second approach would lead to WOx being the surface groups on all particle, which, again would lead to better mixing and less segregation. This concept expands to multiple material powders where the number of different powder materials is preferable 2-10, more preferably 2-5, or more preferably 2-3. Tungsten can be applied to particle surfaces by known ALD processes; see, e.g., Herrmann et al., "Multilayer and functional coatings on carbon nanotubes using atomic layer deposition," Appl. Phys. Lett, 87, 123110 (2005). Tungsten oxide can be bonded to the surface of C particles through defects in the carbon such as edge defects, or O-containing defects that may be either present in the substrate or generated in the substrate through pretreatment with plasma or $O_3$.

11. Core Particle Melting/Sintering Resistance

In many preferred embodiments, the coating has a melting point that is higher than the melting temperature of the core; in some of these cases, the core may soften prior to the coating. One embodiment of this would be the development of a film which prevents the particles from undesirably sintering together in a heated bed, in a mixture or under pressure during the preparation process.

In another embodiment of the invention, coatings of a given material may be applied to one or more powders to retard sintering of one material in a powder that comprises two or more materials. One problem in creating materials such as cermets or other composite metallic/inorganic materials (such as metal matrix composites, MMCs, or multilayer metal/ceramic structure like multilayer ceramic capacitors, MLCCs) is that the metal components typically sinter at much lower temperatures than the inorganic (ceramic) components. The method here is the coating of the metallic, or more generally, the lower sintering temperature powder or material, with a coating that slows, reduces, retards or otherwise impacts the sintering of the metallic or lower sintering temperature material. In some preferred embodiments, this coating increases the sintering temperature of the lower sintering temperature material. By increasing the sintering temperature of the lower sintering temperature material to be closer to that of the higher sintering temperature material, a more uniform composite material can be created as less segregation occurs during sintering. A specific example would be coating a metal powder (e.g., Ni) with an oxide coating (e.g., Lithium titanate) such that when the metal (Ni) is sintered alongside a ceramic material (e.g., titanium carbide, $BaTiO_3$, etc), the sintering is enhanced such that segregation of the materials is less than without coating one of the two components. Cermet and MMCs materials may include carbides or nitrides of titanium, tantalum, tungsten, niobium, or molybdenum, and other materials combined with a binder of nickel, cobalt, molybdenum and other materials. In some embodiments of any of the inventive aspects, the electrode particles may consist essentially of Ni particles having a titania coating having a calculated thickness of 0.3 nm to 0.5 nm. In other embodiments of any of the inventive aspects, the electrode particles may consist essentially of Ni particles having a titania coating having a calculated thickness of 0.3 nm to 4.5 nm or 3.5 nm to 4.5 nm.

Example

Nickel powders (80 nm average diameter, 10 $m^2/g$ specific surface area) were coated with titanium oxide ($TiO_2$) by atomic layer deposition gas phase process. The weight percent of titanium in the final powder was measured by inductively coupled plasma atomic emission spectroscopy (ICP/AES) as 1 wt %. Assuming that all the titanium is present as titanium dioxide with a density of 4.2 $g/cm^3$ and that the film is spread continuously and uniformly over the surface area, geometric calculations can yield an estimated film thickness. In this case, one gram of coated powder will have 10 $m^2$ of surface, and have a titanium content of 0.01 g. This corresponds to 0.017 g of $TiO_2$, with a volume of 0.0040 $cm^3$. That volume of $TiO_2$ distributed across the 10 $m^2$ of coated powder yields a coating thickness of 0.4 nm.

Generally, "calculated thickness" is the thickness that is calculated based on surface area, elemental composition assuming the material is the dense form of the stoichiometric composition assuming it is in the most stable form (for example, titania is assumed to be present as rutile in order to calculate thickness) and the coating is assumed to be uniformly distributed over the entire surface area.

In subsequent trials, the same Nickel powders were coated with thicker titanium oxide (TiO2) coatings by the atomic layer deposition gas phase process. The weight percent of titanium in the final powders were again measured by inductively coupled plasma atomic emission spectroscopy (ICP/AES), and were 2 wt %, 3 wt %, 5 wt % and 10 wt %. Following the previous calculations, those volumes of $TiO_2$ distributed across the 10 m2 of coated powder yielded coating thicknesses of 0.8, 1.2, 2.0 and 4.0 nm.

~0.5 g of coated powder having a $TiO_2$ thickness of 0.4 nm was pressed in a 6 mm stainless steel die using a hydraulic press at 350 MPa for 90 seconds. The sample was then placed in a horizontal-pushrod dilatometer (Netzsch 402 C) and heated to 1000° C. at a rate of 5° C. min$^{-1}$ while flowing 100 sccm of nitrogen. The sample was then cooled, at a rate of 20° C. min$^{-1}$.

Figure 4:
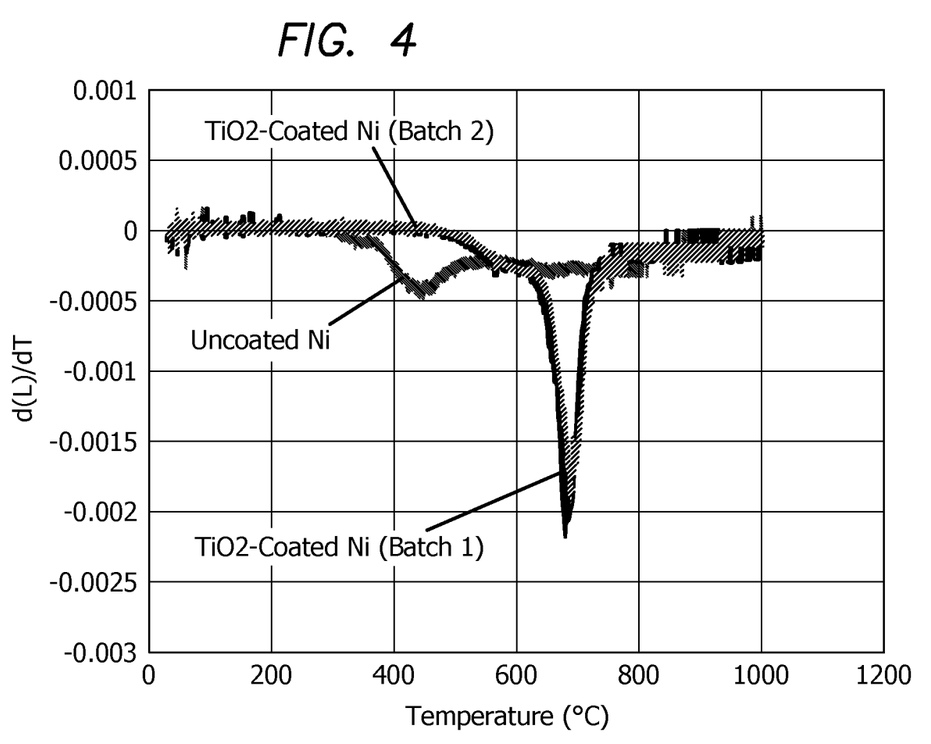
FIG. 4 shows the dilatometry testing results from an ALD titania-coated nickel powder.

As the powders sinter together, the cylinder shrinks. The coated powders were compared to the uncoated powders. See FIG. 4. The coated powders begin the rapid sintering phase of the densification at a temperature more than 100° C. greater than the uncoated powders. This demonstrates that even very small coatings onto the surface of particles can significantly retard the sintering temperature of the powders.

Sintering temperature is defined as the temperature showing the highest shrinkage rate when the powder is heated at a rate of 5° C. min$^{-1}$ under flowing nitrogen. The sample for measuring shrinkage rate is prepared by pressing 0.5 g of powder in a 6 mm stainless steel die using a hydraulic press at 350 MPa for 90 seconds. The sample is then placed in a horizontal-pushrod dilatometer.

12. Coatings onto Powders for Better Inks

One element of the innovation is to enhance the dispersion of the powders filling the resin or liquid matrix (e.g., solvent or dispersant). This can allow for both better uniformity as well as the enablement of higher solids loading without negatively impacting the processing of the filled resin or ink (also called a slurry). ALD/MLD coatings can significantly enhance the wetting of the powders into a liquid matrix. This improved wetting will enable higher stability and easier use of filled liquids.

Contemplated Example

Barium titanate ($BaTiO_3$) powders can be coated with 1 nm of titanium oxide ($TiO_2$) by atomic layer deposition techniques. It is believed that the $TiO_2$ coated $BaTiO_3$ will be able to be loaded with at least 10 wt % higher solids loading then the uncoated $BaTiO_3$ while maintaining (within ±20% or within ±10%) the ASTM D2270 viscosity index of the dispersion. Additionally, the $TiO_2$ coating can create a barrier to the dissolution of $Ba^{2+}$ which is typically seen in aqueous dispersions of $BaTiO_3$. The pH as measured by ASTM E70-19 of the coated dispersion would be stable (less than 0.5 increase in pH) at pH 7 over 12 hours while the uncoated dispersion may increase from pH 7 to pH 9 over 12 hours.

13. Coatings and Etchings for Elemental Additions and Subtractions to Make Tailored Alloys ALD/MLD can be used to add small amounts of elements or compounds to powders to make tailored alloys. Atomic Layer Etching or spontaneous etching can be used to remove targeted elements or compounds to powders to make tailored alloys. Current metal or ceramic powders are sold to conform to an elemental composition specification which defines the specification typically with ranges, or upper or lower boundaries. MLCCs layers may require more or less of a specific element or compound. Thus, this embodiment of the invention provides for custom alloy generation before or during part fabrication.

Another embodiment of this invention is to perform ALD-like processes during printing to add back into the powder/part/build low concentrations of elements or compounds that are volatilized by the laser and thus are not present in the final part. ALD/MLD-like processes in this embodiment would enable replacement of wanted elements/compounds that would otherwise be deficient in the final part. Such deficiencies can lead to poor part performance due to problems relating to microstructure, for example.

Contemplated Example

Zirconium dioxide ($ZrO^2$) is synthesized at high temperature and must then be cooled to room temperature. During this cooling, the desirable cubic phase of $ZrO_2$ recrystallizes to the undesirable monoclinic phase. To overcome this, the zirconia can be stabilized with 3-8 mol % of yttrium, to form yttria-stabilized zirconia (YSZ). Using ALD, it is possible to start with a core particle consisting of 3 mol % yttria-stabilized zirconia (3YSZ), and depositing an yttria shell around it using the methylcyclopentadienyl yttrium/oxygen ALD chemistry at 300° C. When the coated particle is combined with an alumina sintering aid, either by ALD coating with alumina (for instance via trimethylaluminum/water at 150° C.), physical mixing with alumina particles, or some other method, the excess yttria on the surface combines with the alumina to form a yttria alumina garnet phase (YAG) that aids in liquid phase sintering the particles. Without the yttria coating, the yttria required comes from the core 3YSZ particle, changing the crystal structure and potentially allowing for the formation of the undesirable monoclinic phase of zirconia in the finished part.

14. ALD/MLD Coatings onto Intermediate Fabricated Parts

Densification—add a sintering aid to the formed green body. This will reduce the amount of material added into the finished part because the touch points between the particles are not needed to be coated.

ALD can be used to add additional sintering material to partially densified green bodies and parts. For green bodies that are still porous enough to allow gas-phase access to void spaces between particles, ALD can deposit a sintering aid. The aid will only deposit onto the walls of the void space; touch points between particles (where the sinter aid is not needed) will not be coated. This further minimizes the amount of sintering aid used, and maximizes the content of the core particle in the finished part after sintering.

EXAMPLES

Barium titanate powders can be pressed into a green body with low relative density. The green body can be coated with a lithium fluoride sintering aid at 300° C. using the lithium tetramethylheptanedionate/titanium tetrafluoride ALD chemistry. The LiF film deposition is limited to areas of the green body where the $BaTiO_3$ powders are not in direct contact with each other. During final sintering, the LiF aids in the further densification of the BaTiO3, but the finished part has a lower LiF content than if the powder had been fully coated with LiF prior to green body formation.

15. Sintering Aids in Alternating Layers

The invention may also include an intermediate structure for making an MLCC, comprising: a plurality of alternating dielectric and electrode green layers; the dielectric green layers comprising a plurality of powders of dielectric materials; the electrode green layers comprising a plurality of powders of electrode materials coated with a sintering aid; and wherein the powders of dielectric materials are not coated with the sintering aid. The sintering aid has the ability, at sufficiently high temperature, to migrate from the electrode layer into the dielectric layer where it aids in the sintering of the dielectric layers.

The intermediate (or green) structure may further include powdered sintering aid; for example, a powdered sintering aid dispersed in the dielectric layers. Some preferred sintering aids, either as powders or coatings (preferably applied by ALD) include $SiO_2$, $Li_2O$, $B_2O_3$, ZnO, or combinations thereof. More broadly, some preferred sintering aids, either as powders or coatings (preferably applied by ALD) include cations of Si, Li, B, Zn, Ti, Al, Bi and/or Y, in the form of an oxide, nitride, metal, semi-metal, metalloid, sulfide or halide, or combinations thereof. In some the aforementioned embodiments, the cation of these preferred sintering aids represents a first cation, and the sintering aid further includes a secondary cation having a valence state that is less than the first cation. Preferred cations having a +1 valence state include Li, Na and K; preferred cations having a +2 valence state include Zn, Mg, Ba and Sr; preferred cations having a +3 valence state include B, Al, Sc, Ga, Sb, Y and Nb; preferred cations having a +4 valence state include Ti, Zr, Ge, Ru, Sn and Hf; preferred cations having a +5 valence state include P, V, Nb, Sb and Ta; preferred cations haying a +6 valence state include Cr, Mo and W. Preferred examples combinations of first and second cations (each respectively) satisfying the aforementioned valence state criterion include: Al and Zn, Ba and Ti, B and Ti, B and Zr, Y and Zr, Na and Si, K and Si, B and Si, Li and Zn, Zn and Ti, Bi and Ti, Ti and Ta, Zn and W, B and Ta, Li and Sn, Sr and Ti, Sr and Zr, Sr and Sn, and Bi and Hf.

It has been discovered that in particular sub-stoichiometric ratios (preferably at least 5% substiochiometric, in some embodiments in the range of 5 to 50%) of the second cation to the first cation is particularly beneficial to promote the ability of the sintering aid, at sufficiently high temperature, to migrate from the electrode layer into the dielectric layer where it aids in the sintering of the dielectric layers. Exemplary compositions include a sintering aid comprising Ba and Ti, each in the form of an oxide; typically the stoichiometric combination of these elements would take the form of $BaTiO_3$, where the ratio between Ba and Ti is 1. In particular, it has been discovered that ratios of the first cation (defined as the cation with the higher valence state) to the second cation ranging from 0.50 to 0.95 can further enhance the ability for the sintering aid to migrate from the electrode layer into the dielectric layer where it aids in the sintering of the dielectric layers. The term 'further enhance the ability' here can be quantified by a reduction in temperature required for the sintering aid to migrate from the electrode layer into the dielectric layer where it aids in the sintering of the dielectric layers by at least 10° C., sometimes 20 to 25° C., and occasionally 30 to 50° C., relative to the sufficiently high temperature of a sintering aid applied using ALD having a first cation and second cation at a stoichiometric ratio.

In some embodiments of any of the inventive aspects, the electrode particles may consist essentially of Ni particles having a barium titanium oxide coating having a calculated thickness of 3.5 nm to 4.5 nm, where the ratio of barium to titanium is 0.60 to 0.80 (20 to 40% substiochiometric). In some embodiments of any of the inventive aspects, the electrode particles may consist essentially of Ni particles having a strontium titanium oxide coating having a calculated thickness of 2.0 nm to 3.5 nm, where the ratio of strontium to titanium is 0.55 to 0.85. In some embodiments of any of the inventive aspects, the electrode particles may consist essentially of Ni particles haying a bismuth titanium oxide coating having a calculated thickness of 3.0 nm to 4.5 nm, where the ratio of bismuth to titanium is 0.50 to 0.75. In some embodiments of any of the inventive aspects, the electrode particles may consist essentially of Ni particles having a zinc titanium oxide coating having a calculated thickness of 4.0 nm to 5.5 nm, where the ratio of zinc to titanium is 0.75 to 0.95.

The invention also includes a method of sintering the intermediate structure, comprising: heating the intermediate structure to a temperature sufficient for the sintering aid to migrate into the dielectric layers; and sintering the structure to form a fired laminate.

In a related aspect, the invention includes an MLCC structure, comprising: a plurality of alternating electrode and dielectric layers; wherein the dielectric layers comprise a sintering aid or a phase enriched in sintering aid; wherein the dielectric layers have a thickness, an interior and two surface regions and an interior region sandwiched between the two surface regions; wherein each of the surfaces contact the electrode layers and are defined to have a thickness that is 20% of the thickness of the dielectric layer; wherein the sintering aid or phase enriched in sintering aid is unevenly distributed in the dielectric layers such that the concentration of sintering aid or phase enriched in sintering aid is higher in the surface regions than in the interior region. In some embodiments, at least 10% or at least 20% higher. In some embodiments, there are at least 4 electrode layers and 4 dielectric layers, or at least 10 electrode layers and 10 dielectric layers.

The phrase "sintering aid or a phase enriched in sintering aid" includes a sintering aid or an artifact of a sintering process that can be identified by elemental analysis. In other words, the presence of a "sintering aid or a phase enriched in sintering aid" can be identified by the presence of sintering aid element(s) left over after a reaction or dispersion in a dielectric composition.

MATERIALS AND METHODS

Tests have been developed and performed on core metal powders with coatings. Below is a discussion of the methods and results of such tests.

PROCEDURE

The procedure used for each run is listed below.
1. For each sample number shown in Table 2, a 75 ml atomic layer deposition (ALD) reactor was loaded with ~100 g of an AlSi10Mg powder. The reactor was evacuated and the powder was allowed to desorb water at room temperature overnight. This was done to limit any reaction between the water and the hot substrate powder. The residual gas analyzer (RGA) detected only water desorption from the bed.
2. The following morning, the reactor was heated to 180° C. and the powder was dried for 4 hours.

3. The powder was coated with the relevant number of cycles according to Table 2. The RGA was used to detect gas phase products ensuring the deposition was consistent with that of alumina.
4. The reactor was cooled to room temperature and pressurized.
5. The powder was recovered and packaged.

TABLE 1

| | Dose Recipe | | | | |
|---|---|---|---|---|---|
| Step | Time | Valve 1 | Valve 2 | MFC1 | MFC2 |
| Dose TMA | 300 | 1 | | 5 | 5 |
| Purge TMA | 150 | | | 10 | 10 |
| Dose H2O | 300 | | 1 | 5 | 5 |
| Purge H2O | 600 | | | 10 | 10 |

ANALYTICAL METHODS

Residual Gas Analyzer—The residual gas analyzer (RGA) is a mass spectrometer used to sample the effluent gas from the process. It provides real time information about the progress of the ALD process or any side reactions and is typically used for feedback control of the ALD process. The RCiA also proNides leak check and substrate degassing information.

Thermogravimetric Analysis for Oxidation—The thermogravimetric analyzer, TGA, is used as an ex-situ analysis tool to examine mass change behavior of a sample as it is raised to elevated temperature. An $N_2/O_2$ atmosphere is used while ramping the substrate to observe oxidation protection offered by the ALD film, and possible infer film effectiveness or thickness.

Powder Flow Testing—The powder flow function of the materials was testing using the Brookfield PFT. The provided the information on the effect of the ALD film on the flowability of the powder.

RESULTS AND DISCUSSION

Table 2 summarizes each of the coating runs performed.

TABLE 2

| | Coating Runs performed | | | | | | |
|---|---|---|---|---|---|---|---|
| ALDN ID | Cycles | Film | Load Mass (g) | Recovered Mass (g) | Drying Temp (° C.) | Coat Temp (° C.) | Drying Time (hrs) | Run Time (hrs) |
| T326a | 1 | Al2O3 | 105.2 | 104.6 | 180 | 180 | 4 | .25 |
| T327a | 100 | | 105.1 | 104.6 | | | | 23.2 |
| T328a | 5 | | 105.9 | 105.2 | | | | 1.4 |
| T329a | 50 | | 103.9 | 103.2 | | | | 12 |
| T330a | 25 | | 103.8 | 103.3 | | | | 6.4 |
| T331a | 0.5 | | 105.5 | 105.0 | | | | 0.1 |

TABLE 3

| | Precursor Consumption | |
|---|---|---|
| ALDN ID | Prec A Consump (g) | Prec A Theoretical (g) |
| T326a | — | — |
| T327a | 3.8 | 5.6 |
| T328a | 0.6 | 0.3 |
| T329a | 1.6 | 2.8 |

TABLE 3-continued

| | Precursor Consumption | |
|---|---|---|
| ALDN ID | Prec A Consump (g) | Prec A Theoretical (g) |
| T330a | — | — |
| T331a | — | — |

T326a

Figure 2:
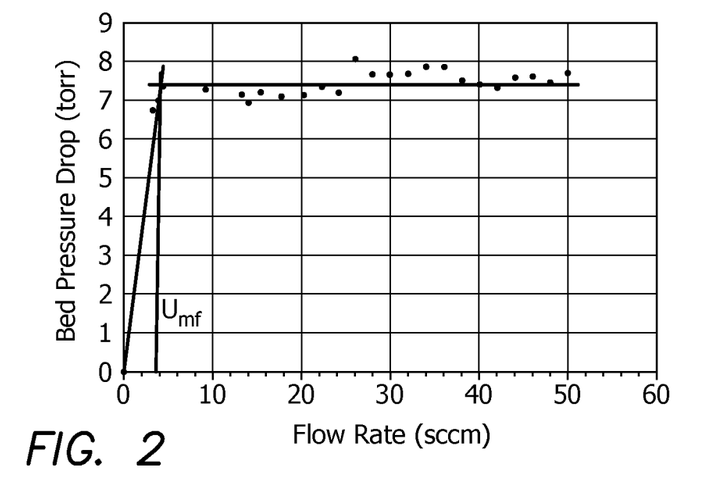
FIG. 2 shows fluidization performance of the powder described in the Examples.

The material dried without issue, and fluidized well (FIG. 2). The coating went as expected, outside of a slightly erratic H2O flow. This likely did, not have an effect on the run. The RGA data was consistent with the deposition of alumina.

TGA Analysis

Figure 3A:
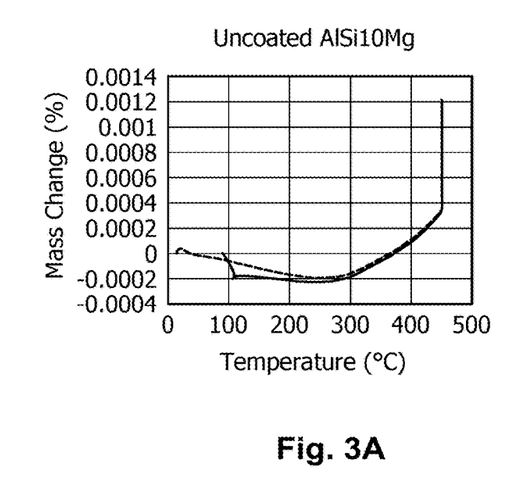
FIGS. 3A-D and 3F-H show the results from thermogravimetric analysis (TGA) of the uncoated AlSiOMg powder (FIG. 3A) and AlSiOMg samples coated with differing numbers of ALD cycles as shown in Table 2 (FIGS. 3B-D and 3F-H).
Figure 3B:
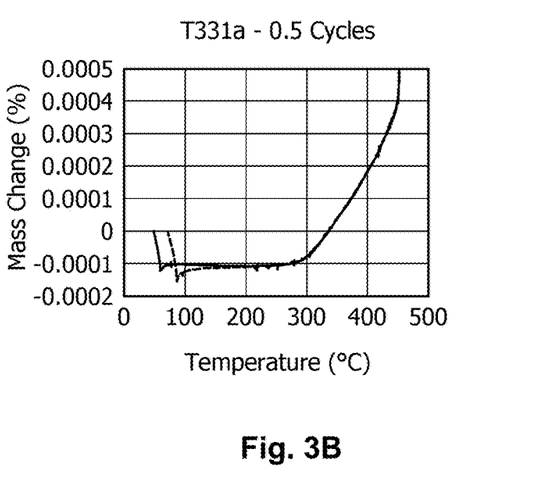
Figure 3C:
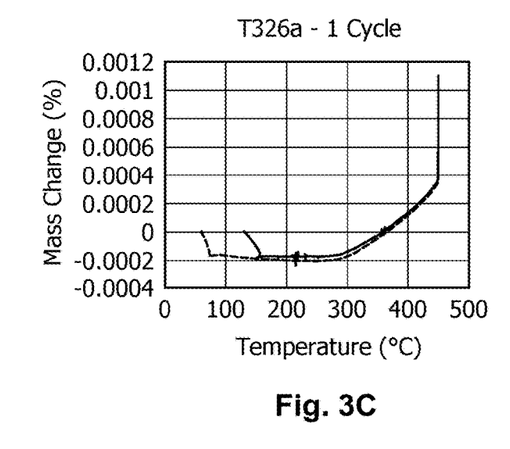
Figure 3D:
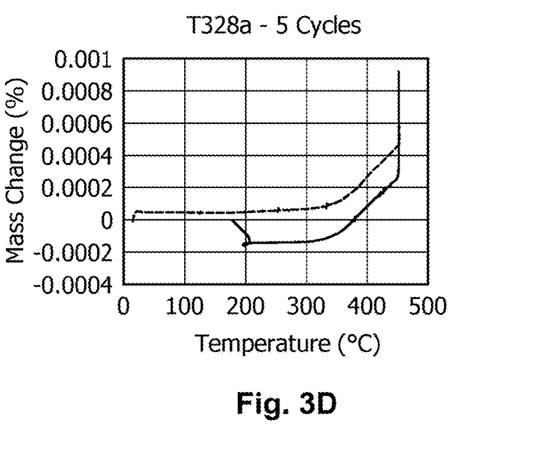
Figure 3E:
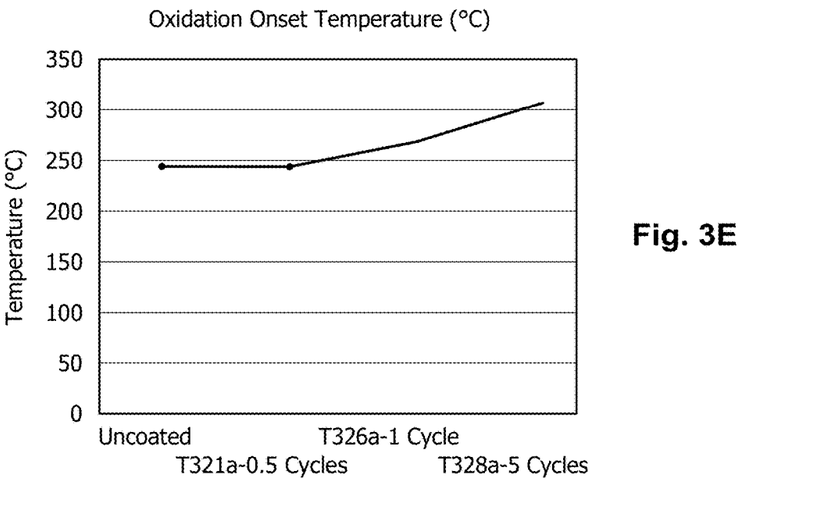
FIG. 3E shows the oxidation onset temperature of the samples coated with fewer than 25 cycles.
Figure 3F:
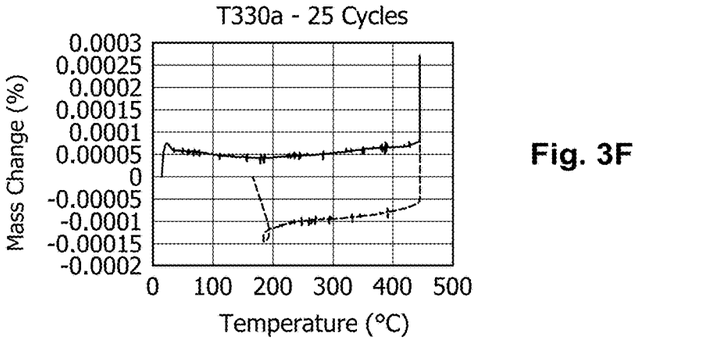
Figure 3G:
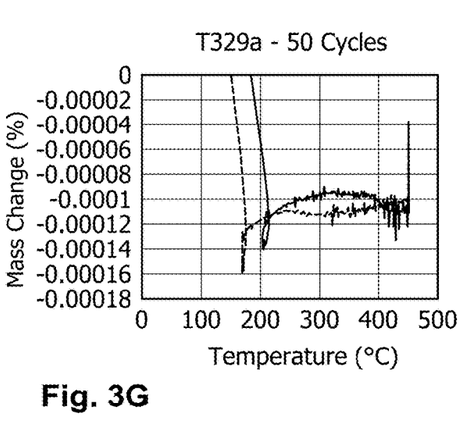
Figure 3H:
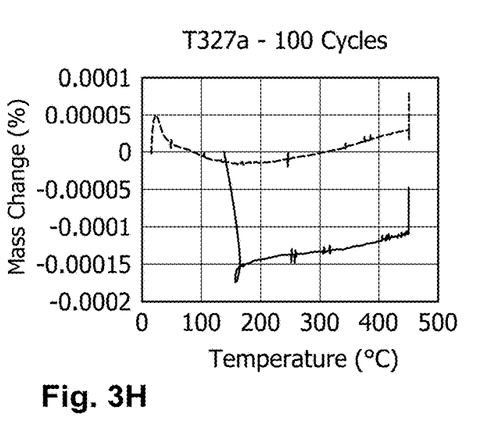

The samples were tested in the TGA by heating them at 10° C./min to 450° C. in oxygen (see FIGS. 3A-D and 3F-H). Samples with 5 cycles or less were oxidized by these conditions (see FIG. 3E), while 25 cycles and more showed no oxidation. The uncoated material showed appreciable mass loss with heating at lower temperatures (see FIG. 3A). This could be an indication of adsorbed water.

What is claimed:

1. An intermediate structure, comprising:
a plurality of green layers comprising metallic particles having a coating;
wherein the coating is formed by coating the metallic particles by ALD to render the particles non-pyrophoric;
wherein the metallic particles comprise pyrophoric Zn, Al, Cu, or Ti; wherein at least 90%, by number, of the coated particles have diameters in the range of 20 μm or less; and
wherein the coating comprises $Y_2O_3$.

2. The intermediate structure of claim 1 wherein the metallic particles are pyrophoric Ti.

3. The intermediate structure of claim 1 wherein the coated particles are spherical.

4. The intermediate structure of claim 1 wherein the coating has a thickness of 0.2 to 50 nm.

5. The intermediate structure of claim 1 wherein the coating has a thickness of 0.2 to 2 nm.

6. The intermediate structure of claim 1 wherein the ALD coating covers at least 60% of the particle surface.

7. The intermediate structure of claim 1 wherein the coating is conformal.

8. The intermediate structure of claim 1 wherein the coating is applied by at least 10 cycles of ALD.

9. The intermediate structure of claim 1 wherein the coating is applied by 10-100 cycles of ALD.

10. The intermediate structure of claim 1 wherein the metallic particles are pyrophoric Zn or are pyrophoric Al.

11. The intermediate structure of claim 1 wherein the metallic particles are pyrophoric Cu.

12. The intermediate structure of claim 1, wherein the coating is $Y_2O_3$ deposited by ALD using alternating exposures of tris (isopropylamidinate) yttrium and water, tris (methylcyclopentadienyl) yttrium and ozone, and tris(2,2,6,6,-tetramethyl-3,5-heptanedionate) yttrium and oxygen.

* * * * *